Sept. 5, 1944.  C. G. FLYGARE ET AL  2,357,510
GRINDING MACHINE
Filed Aug. 17, 1943   4 Sheets-Sheet 1

Inventors
CARL G. FLYGARE
WALLACE H. WOOD
By Clayton L. Jenks
Attorney

Sept. 5, 1944.   C. G. FLYGARE ET AL.   2,357,510
GRINDING MACHINE
Filed Aug. 17, 1943   4 Sheets-Sheet 2
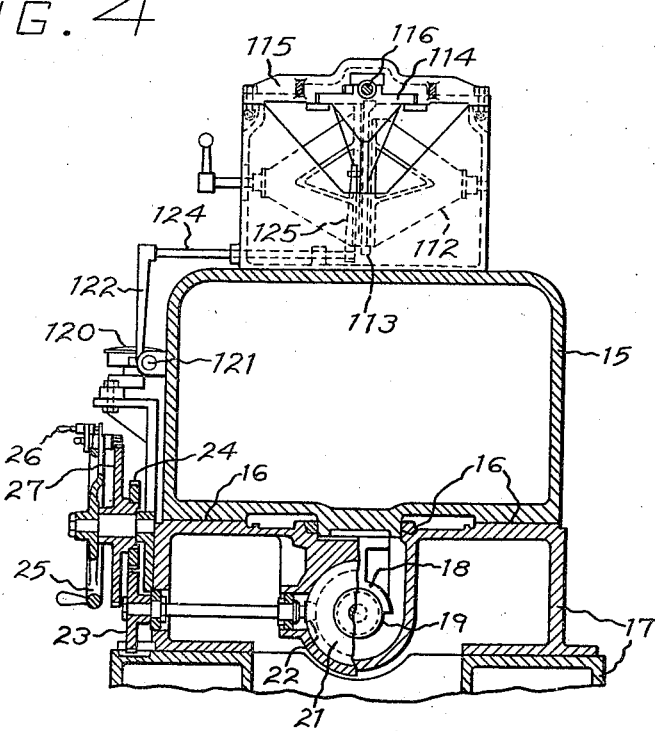
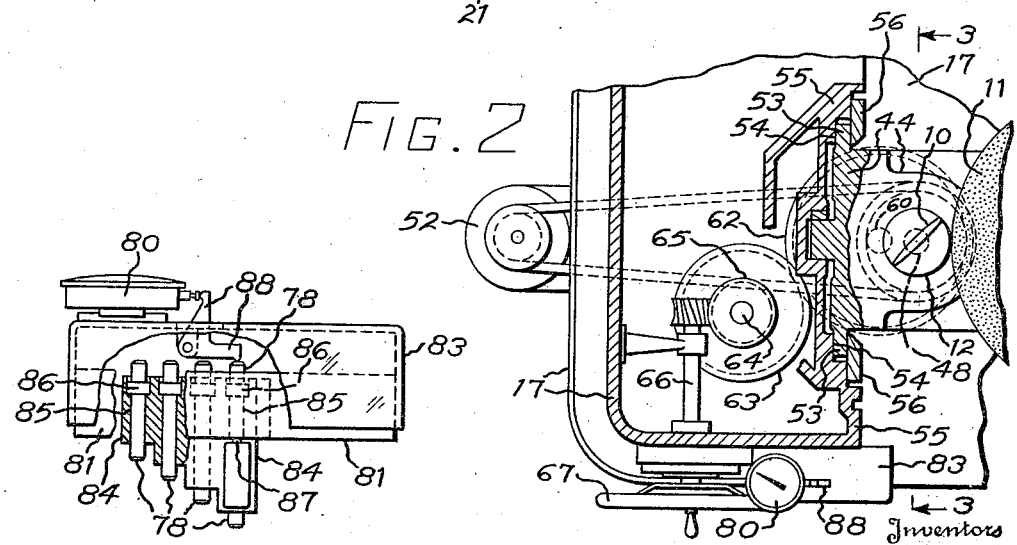
Inventors
CARL G. FLYGARE
WALLACE H. WOOD
By Clayton L. Jenks
Attorney Sept. 5, 1944.   C. G. FLYGARE ET AL   2,357,510
GRINDING MACHINE
Filed Aug. 17, 1943   4 Sheets-Sheet 3
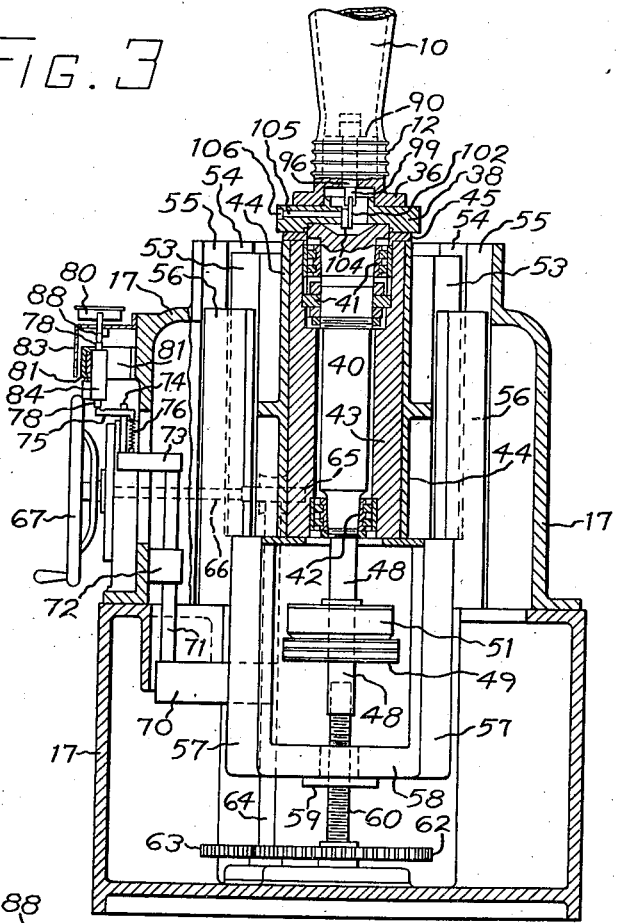
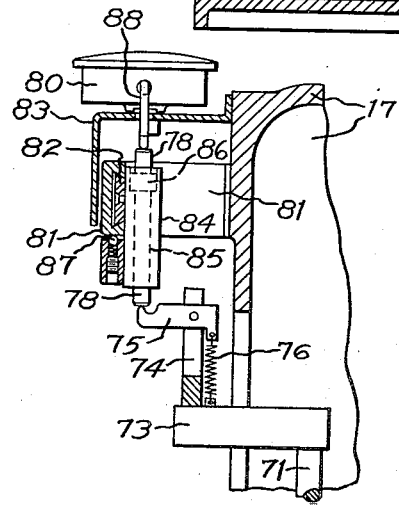
Inventors
CARL G. FLYGARE
WALLACE H. WOOD
By Clayton L. Jenks
Attorney Sept. 5, 1944.  C. G. FLYGARE ET AL  2,357,510
GRINDING MACHINE
Filed Aug. 17, 1943  4 Sheets-Sheet 4
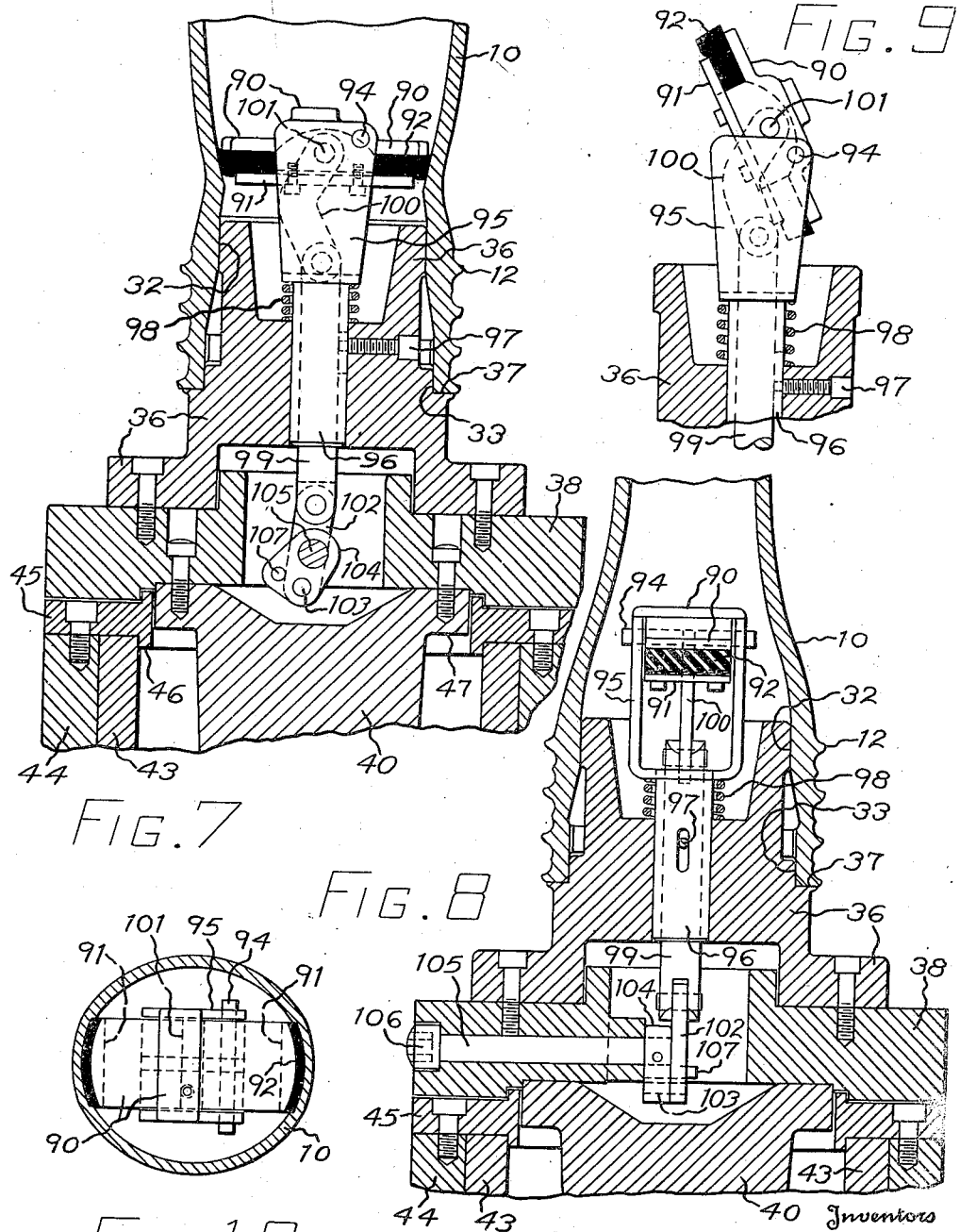
Inventors
CARL G. FLYGARE
WALLACE H. WOOD
By Clayton L. Jenks
Attorney Patented Sept. 5, 1944

2,357,510

UNITED STATES PATENT OFFICE 2,357,510

GRINDING MACHINE

Carl G. Flygare and Wallace H. Wood, Worcester, Mass., assignors to Norton Company, Worcester, Mass., a corporation of Massachusetts Application August 17, 1943, Serial No. 498,958

8 Claims. (Cl. 51—105)

This invention relates to grinding machines and more particularly to a machine for grinding an external cylindrical surface, or a series of spaced surfaces, such as the ball raceways on the hub of an airplane propeller blade.

One type of airplane propeller blade is made of a reinforced metal tubing pressed to the desired blade shape. The blade may be mounted for feathering to control the plane speed, and for this purpose its hub is provided with a set of external ball raceway grooves. Because the blade may be very long and of unwieldy shape and size, the production of a set of accurately spaced and shaped raceways is difficult. If the blade is held by locating fixtures in a horizontal position, it tends to wobble or to distort in shape as it is rotated. Difficulties and a waste of time are also met in mounting the work and in indexing it to the required positions for grinding the series of parallel raceways.

A primary object of this invention is to provide a grinding machine which will grind accurately an external peripheral surface on an irregularly shaped work piece or other type of work which cannot be readily mounted on a work support having a horizontal axis or rotated about such an axis without detrimentally affecting the grinding operation.

Another object of this invention is to provide a machine capable of grinding accurately a set of spaced surfaces, such as the ball raceways on the hub of a propeller blade and other types of work, by a plunge cut grinding operation.

A further object is to provide a grinding machine in which the grinding wheel and the work are relatively movable to grind any desired portion of the work and wherein the grinding position is accurately predetermined.

Another object is to provide a work supporting and rotating mechanism with an indexing and locating device capable of positioning the work for grinding a series of accurately spaced surfaces.

A still further object is to provide an indexing mechanism in which replaceable gauges of desired and accurate dimensions are employed for relatively positioning the work and the wheel in successive locations as required.

In accordance with this invention, a work piece, such as a propeller blade, is mounted to rotate about a vertical axis and it is supported only at its bottom for a grinding operation. A suitably shaped grinding wheel is also mounted to rotate about a vertical axis, and it is held axially immovable on a wheel slide arranged to feed the wheel horizontally into the work. In order that a desired surface on the work may be ground, the work and the wheel are relatively movable vertically, and the position of the movable part is determined by a set of gauges associated with the mechanism which elevates and adjusts the movable part.

Referring to the drawings which illustrate a preferred embodiment of this invention adapted for grinding the ball raceways of a propeller blade:

Fig. 2 is a fragmentary top plan view partly broken away to show the work supporting slide;

Fig. 3 is a vertical section through the machine taken on the line 3—3 of Fig. 2;

Fig. 4 is a vertical side elevation, with parts broken away to show the wheel slide feeding mechanism;

Fig. 5 is a fragmentary detail in section showing the gauge mechanism for positioning the work;

Fig. 6 is an enlarged front elevation, partly broken away, of the gauge mechanism;

Fig. 7 is a vertical section, partly broken away, of the work supporting and clamping mechanism;

Fig. 8 is a section taken at right angles to that of Fig. 7;

Fig. 9 is a detail showing the work clamp in the released position; and

Fig. 10 is a section through the work looking down upon the work clamp.

Figure 1:
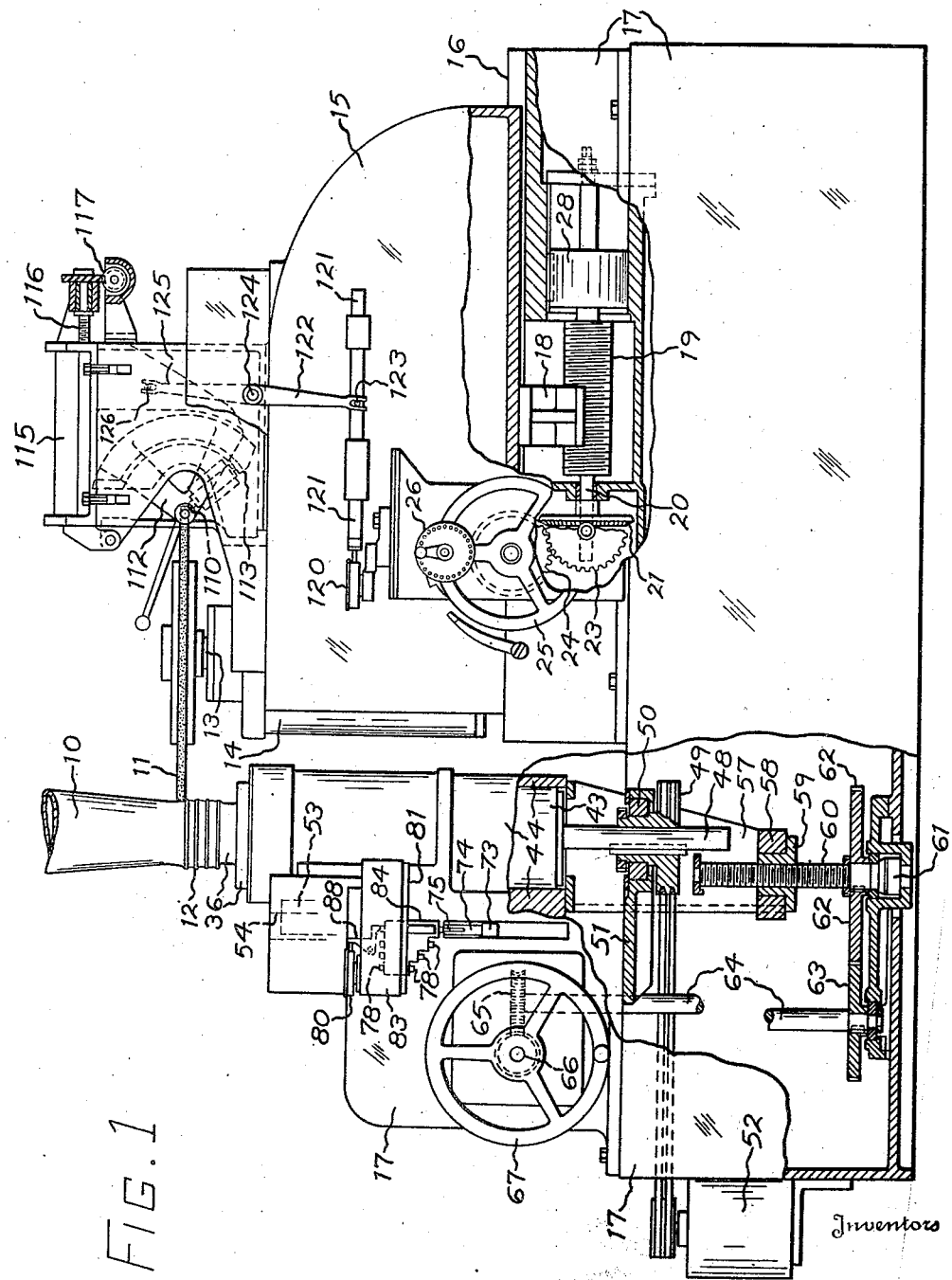
Fig. 1 is a vertical elevation of the machine, with parts broken away to show details of construction.

The grinding machine illustrated in the drawings is adapted for grinding spaced ball raceways on the hub of an airplane propeller blade 10 by means of a grinding wheel 11. It comprises mechanism for supporting the propeller blade 10 in a vertical position and rotating the same about the axial line of its cylindrical hub 12. The grinding wheel is suitably mounted on a vertical shaft 13 which is axially parallel with the work axis. Suitable power mechanism may be provided for rotating the grinding wheel shaft, such as a standard electric motor 14 of a constant speed type. The wheel and motor shaft is supported in suitable radial and end thrust bearings, and the vertical position of the wheel is thereby accurately determined. The wheel and the work are relatively movable both to position a desired portion of the work opposite the wheel and to feed the wheel into the work. In the preferred construction, the grinding wheel support, including the electric motor, is mounted on a wheel slide 15, which in turn is slidably mounted on suitable horizontal ways 16 on the machine base 17. The wheel is axially immovable, or not movable vertically along its axis, but it may be moved towards and from the work with its side faces lying always in the same parallel planes.

The wheel slide may be moved by suitable or standard construction. As shown, the under side of the wheel slide is provided with a half nut 18 engaging the thread of a large screw 19; and the latter is adapted to be rotated by a suitable micrometer mechanism for manually adjusting the position of the grinding wheel. In the form shown particularly in Figs. 1 and 4, the screw 19 is supported at one end on a small shaft 20 suitably mounted in bearings in the framework. This shaft carries a bevel gear 21 meshing with another gear 22 on one end of a short cross shaft which has fixed on its other end a gear 23 meshing with a further gear 24 on the micrometer hand wheel shaft. The hand wheel 25 and the associated micrometer mechanism 26 serve to rotate a gear 27 which turns the gear 24 and this moves the wheel slide. All of this may be of standard construction. The right hand end of the screw 19 is carried on a large bearing member 28 suitably mounted in the machine base. This construction may be made according to the U. S. Patent to Wood No. 2,294,872 of Sept. 1, 1942. If desired, the wheel slide may be moved hydraulically by power mechanism such as that shown in the U. S. Patent to Cole No. 2,283,792 of May 14, 1942.

An important feature of this invention relates to the work supporting and adjusting mechanism. The propeller blade or other work piece is held rigidly in a vertical position in axial parallelism with the wheel. The work is mounted to be both rotated and adjusted vertically. In the preferred construction, it is mounted fixedly on and in axially alignment with a rotatable, vertically adjustable support. As shown particularly in Fig. 7, the cylindrical hub 12 of the propeller blade has two axially concentric, spaced cylindrical interior surfaces 32 and 33 which slidably fit against mating surfaces on a short support or post 36 which rotates about a vertical axis. The flat end of the hub 12 rests on a horizontal annular shoulder 37 on this post, and this support 37 is shaped accurately to lie in a horizontal plane which is thus perpendicular to the axis of the vertical surfaces 32 and 33, so that the propeller blade is held with its hub axis coinciding with the vertical axis of the post. The post 36 is secured, as by screws, to the horizontal top of an annular plate 38. The plate 38 is in turn secured by screws to the top of a rotatable vertical shaft 40, whose axis coincides with the axis of the post 36.

The shaft 40 is suitably mounted in thrust and radial bearings 41 and 42 (Fig. 3) carried in an outer sleeve 43 fitted within a hollow cylindrical slide casing 44. An annular plate 45 (Fig. 7) is secured to the top of the casing 44 and is provided with a T-shaped flanged portion 46 which clamps against the inside of the sleeve 43 and bears against an annular shoulder on the under side of the plate 38 as well as the flanged top 47 of the shaft 40. These parts locate the work supporting structure so that the work may rotate in axial alignment with the shaft 40. The lower reduced end 48 (Figs. 1 and 3) of the plunger shaft 40 is slidably keyed within the hub of a pulley 49 suitably suspended in bearings 50 on the horizontal frame member 51 of the machine frame. The pulley is rotated at a desired slow rate by a belt leading from an electric or other suitable type of motor 52 mounted on the outside of the machine base.

Provision is made for moving the work vertically along its axis and relative to the grinding wheel, so that the axially immovable wheel may grind a series of parallel ball raceways. To this end, the casing 44 is provided with two aligned, laterally projecting slide members or flanges 53 (Figs. 2 and 3) which bear against the vertical slide faces 54 formed on a wall 55 constructed as a part of the machine base. The slide flanges 53 are held in place by means of gibs 56 secured by screws to the wall 55.

The casing 44 and associated parts are supported on the top of a hollow frame having spaced, parallel side walls 57 and a horizontal bottom portion 58. The latter carries a threaded bushing 59 which is threaded onto the vertical jack screw 60 supported in suitable bearings 61 at the base of the machine. The jack screw 60 carries near its lower end a gear 62 keyed thereto. This gear meshes with a gear 63 on a suitably supported vertical shaft 64 which carries at its upper end a worm gear 65 meshing with a worm on a horizontal shaft 66 to which is affixed a hand wheel 67. By turning the hand wheel 67, the screw 60 will be threaded through the bushing 59 and thus will adjust the supporting frame vertically and locate the propeller blade carried thereby. The axis of the lifting screw is preferably located in vertical alignment with the center of the mass of the propeller and the supporting slide, as shown in Fig. 1.

Mechanism is provided for locating the work exactly relative to the grinding wheel. This comprises a replaceable gauge block arranged to locate definitely that movable part which positions the wheel opposite the desired portion of the work. In the form illustrated, it is the work support which is moved and thus located. To this end, a laterally projecting arm 70 (Figs. 3, 5 and 6) is secured to the vertically adjustable frame 57. This arm carries a post 71 which suitably slides in a stationary slide member 72 fixed on the interior of the machine casing. The upper end of the post 71 carries a horizontal bar 73 which projects laterally through a vertical slot in the wall of the machine. A vertical yoke or pivot support 74 (Fig. 5) carried on the bar 73 has pivoted thereon a short lever 75 of the first class, which is held in a horizontal position by a suitable device, such as a coiled tension spring 76 secured to the lever and the bar 73. The lever 75 has a knife edge on its outer end which is adapted to contact with one of a plurality of cylindrical gauge blocks 78 connected to move the needle of a dial gauge 80.

Projecting laterally from the machine casing is a fixed L-shaped support 81 having a horizontal dove-tailed slideway carrying an interfitting slide bar 82. A cover 83 keeps out dust. The slide bar carries a somewhat triangularly shaped plate 84 (Fig. 6) provided with a series of vertical, parallel cylindrical holes 85, which are counterbored at their tops to form enlarged recesses. The gauges 78 are cylindrical bodies having enlarged heads 86 fitting within and supported by the bottom shoulders of the recesses. The gauge blocks 78 are of different lengths which are exactly predetermined to locate the work correctly for grinding the spaced raceways. Each gauge corresponds with the position of one race way during grinding.

The gauges 78 are adapted to be moved by the supporting slide bar 82 into position where any required gauge may contact with the rocking lever 75. The slide bar may be moved manually to a desired locating position as determined by a spring pressed detent 87 (Fig. 5) carried by the gauge support 84 which may snap into any one of several accurately spaced recesses in the lower surface of the slide arm 81. The upper end of the operative gauge 78 contacts with the right hand end (Fig. 6) of an L-shaped lever 88 suitably pivoted at its central portion on the cover 83. The upper end of the rocking lever 88 contacts with the outwardly projecting plunger of a standard dial gauge 80. This dial gauge is so calibrated and adjusted as to show the position of the propeller shaft hub relative to the grinding wheel.

In operation, the work piece may be first located as shown in Fig. 1 for grinding the uppermost ball bearing raceway. For this, the longest gauge 78 is used. While the grinding wheel is out of contact with the work, the hand wheel 67 is operated to move the work slide vertically until the dial 80 reads zero or indicates a proper location for the work. After the upper raceway has been ground, then the slide bar 82 is moved to position the next shorter gauge block 78 between the rocking levers 75 and 88 and the operation of adjusting the position of the propeller blade is again repeated.

It is necessary that the work be held rigidly in axial parallelism with the wheel during the grinding operation. This is accomplished by taking advantage of the hollow construction of the propeller blade. The work is held vertically positioned by means of a special clamping device shown particularly in Figs. 7 to 10 inclusive. This comprises a clamp formed of two rectangular metal plates 90 and 91 secured together with a block 92 of hard but slightly elastic vulcanized rubber clamped therebetween. The rubber block is shaped as shown in Fig. 10 to fit within the flaring, elliptical portion of the blade above the hub, and it is slightly longer than the distance across the inside of the blade, so that when drawn into the position of Fig. 7, it fits snugly in place. The clamp is adapted to be tilted to the substantially vertical position shown in Fig. 9 and then inserted upwardly through the bottom opening of the propeller hub, after which the clamping rubber block 92 is drawn down into the horizontal position of Figs. 7 and 8 where it engages the tapered and elliptical surface of the inside of the propeller hub.

The clamp is pivotally mounted on the pin 94 between the two arms of a yoke 95. This yoke is fixed on the top of the slidable sleeve 96 mounted within a recess in the post 36. The sleeve has a slot within which rides the inner reduced end of a screw 97 passing through the post 36, so that the sleeve is permitted only a limited movement. The base of the yoke engages a coiled compression spring 98 supported in the recess of the post 36, and the yoke is urged upwardly thereby to the uppermost position permitted by the slot. This tends to hold the clamping block in the released position of Fig. 9.

Sliding through a hole in the base of the yoke 95 is a rod 99 that slidably fits within the sleeve 96. The vertically slidable rod 99 serves as a draw bar. It is pivotally connected at its upper end to a bent link 100 which is pivotally mounted on a pin 101 on the clamping block. The supporting pivot 94 is off center so that vertical movement of the rod 99 and link 100 raises and lowers the clamp.

A toggle fixed to the lower end of the sliding rod 99 serves to move the parts up and down to operate the clamp. This toggle comprises a link 102 pivoted to the lower end of the rod 99. This link is in turn pivotally connected by a pin 103 at its lower end to a short crank 104 mounted on and revolved by means of the short shaft 105 fixed thereto. The shaft has a head 106 projecting at the outside of the machine and which has a socket shaped to fit a wrench for moving the toggle. When the toggle link is rotated in one direction, the draw rod 99 is moved upwardly to release the clamp. Movement of the toggle to pull down on the clamp is such that the crank 104 may just pass over dead center and be held there by the stationary pin 107 engaging the link 102. The clamp is of such size and so adjusted in position that the rubber body 92 will clamp very firmly against the inside of the propeller hub and thus hold the propeller hub seated firmly on the shoulder 37 of the post 36. When the toggle is released, the spring 98 throws the parts upwardly to the positions of Fig. 9.

The grinding wheel may be trued to the required shape for the plunge cut operation. The truing mechanism may be of any suitable construction, such as one made in accordance with patent to Griffing No. 2,056,149 of Sept. 29, 1939. This may comprise a diamond point 110 (Fig. 1) slideably mounted on a cradle 112 arranged to be manually rocked to swing the diamond radially across the wheel face, the path of the diamond being determined by a fixed cam 113. The cradle is suspended beneath a slide 114 (Fig. 4) suitably mounted on the under side of the casing 115 carried by the wheel slide. The slide 114 has a nut threaded on a rotatable screw 116 which is turned to move the slide and the diamond towards and from the wheel by means of a manually operated worm drive 117.

The position of the truing tool and therefore the position of the grinding wheel relative to the work may also be determined by a dial gauge 120 mounted on a fixed standard carried by the machine base 16. A slide rod 121 mounted for suitable sliding movement on the side of the wheel slide 15 operates the plunger of the dial. A rocking lever 122 engages a pin 123 on the slide rod. The lever 122 is fixed on the outer end of a rock shaft 124 which is suitably mounted in bearings on the wheel slide 15 carrying the truing mechanism. A yoke arm 125 secured to the rock shaft projects upwardly into contact with a pin 126 which is fixed on a member depending from the slide 116 that moves the diamond forward to true the wheel. Thus, when the truing tool is moved by the screw feed mechanism, the pin 126 moves forward with it and causes the plunger rod to move back relative to the dial and so record the movement of the slide. This serves to locate the trued wheel relative to the work.

When the grinding wheel is trued by means of the diamond 110, the reduction in wheel diameter is noted on the dial 120 and suitable adjustment is made therefor by means of the micrometer feed mechanism 26. The dial 120 is mounted on the base of the machine. The rock shaft 124 is carried on the wheel slide 15 and the upper pivot pin 126 is carried on the upper slide 114 which supports the diamond. Hence the movement of these two slides is registered on the dial gauge 120.

The operation of this machine will be apparent in view of the above description. By means of a machine having the work mounted to rotate about a vertical axis and to be ground by a wheel rotating about another vertical axis, it is possible to grind massive or unwieldy work pieces which cannot be readily supported to rotate about a horizontal axis. For example, a long propeller blade is clamped in a vertical position on a rotatable support with one end of the blade free to move, while the end being ground is held rigidly in a proper position for grinding. Since the part being ground is immovable relative to its axis, it does not matter what path is described by the upper free end of the blade. It furthermore is easy to mount the work piece in position, and no jigs or fixtures are required except a clamp shaped to engage a suitable surface of the work piece. The center of mass of the work and the bearing slide carrying the work is in alignment with the axis of the jack shaft 60 which supports the various parts and distortion of the supporting members is thereby minimized. Moreover, the grinding wheel which is suitably supported on radial and end thrust bearings is accurately located by its support because of the influence of gravity, and thus the ball race ways may be correctly located by means of the plug gauges. Both the wheel and the work are positioned by gravity against stops formed by the supporting end thrust bearings.

The location of the work is predetermined by the length of the gauge plug and this does not depend upon the skill of the operator, except as he insures that the gauge 80 reads properly and that the correct gauge plug 78 is employed for the purpose. This insures a very accurate control of the location of the ground parts.

It will now be apparent that various modifications may be made in the constructional features of the machine to permit grinding various types of work. The above disclosure is therefore to be interpreted as setting forth the principles underlying this invention and describing a preferred embodiment of the invention and not as imposing limitations on the appended claims. Certain features relating to truing the wheel and to positioning the work are claimed in copending applications Serial Numbers 503,466 and 503,514 filed September 23, 1943.

We claim:

1. A grinding machine comprising a work support arranged to support and rotate a work piece about a vertical axis, a rotatable grinding wheel axially arranged to grind an annular surface on said work piece, means for adjusting the work piece vertically along its axis so as to position a desired portion thereof opposite the wheel, means for rotating said support about said work axis and means for moving the wheel and the work relatively to feed the wheel into the work.

2. A grinding machine comprising a horizontally movable wheel slide, a grinding wheel mounted thereon to rotate about a vertical axis, a rotatable work support mounted for movement only in a vertical direction, means for rotating the support about a vertical axis, a device on said support which releasably holds a work piece with a peripheral work surface to be ground axially aligned with the support and means for moving the slide to feed the wheel into the work to grind the same.

3. A grinding machine comprising a vertically movable and rotatable work support arranged to rotate a work piece about its axis, means to rotate the support, a rotatable, axially immovable grinding wheel mounted to rotate about a vertical axis, means for rotating the wheel to grind a peripheral surface portion of the work, means for adjusting the work piece vertically along its axis so as to position a desired portion thereof opposite the wheel, and means for relatively moving the wheel and the work horizontally to feed the wheel into the work.

4. A grinding machine comprising a horizontally movable slide, a vertically movable slide, a rotatable work table on one of said slides arranged to rotate about a vertical axis, a device on said table for releasably securing the lower portion of a work piece thereto and in axially alignment therewith, a rotatable grinding wheel mounted on the other slide for rotation about a vertical axis, precision mechanism for adjusting the vertically movable slide to locate a desired peripheral portion of the work piece in grinding relation to the wheel and means for moving the horizontally movable slide to feed the wheel into the work.

5. A grinding machine comprising a horizontally movable wheel slide, a grinding wheel mounted thereon to rotate about a vertical axis, a vertically movable and rotatable work support, means for rotating the work support about a vertical axis, a device for securing only the bottom portion of a piece of work on the top of said support and leaving the top of the work free so that a cylindrical surface to be ground thereon will be axially aligned with the work support, means for moving the slide and feeding the wheel into the work to grind the same and precision mechanism for moving the work support vertically and adjusting the work relative to the wheel.

6. A grinding machine comprising a grinding wheel mounted to rotate about a vertical axis, means for rotating the wheel, a work support mounted to rotate about another vertical axis, means for moving the wheel and the work support relatively to feed the wheel into the work, means for securing a work piece on the support in axial alignment therewith, means for rotating the work support about its axis, said wheel and work being relatively movable vertically to adjust the work position, and precision mechanism, including a set of selectively employed gauge blocks of predetermined sizes, for relatively moving said work and wheel and which precisely indicates the position of the work surface relative to the wheel.

7. A grinding machine comprising a horizontally movable wheel slide, a rotatable grinding wheel thereon mounted to rotate about a vertical axis, a rotatable work support mounted to rotate about another vertical axis, means for moving the wheel slide to feed the wheel into the work, means for securing a work piece on the work support in axial alignment therewith, means for rotating the work about its axis, mechanism for moving the work support vertically along its axis, a stationary standard, a set of replaceable gauge blocks of predetermined sizes movably mounted on said standard and indicator mechanism associated therewith which cooperates with a selected gauge block to indicate the position of the work surface when the work is moved vertically.

8. A grinding machine comprising a horizontally movable wheel slide, a grinding wheel mounted thereon to rotate about a vertical axis, a work support rotatable about another vertical axis, a vertically movable slide carrying said support, mechanism for moving said support vertically to adjust the work relative to the wheel, means on said support engaging only the bottom portion of a work piece and leaving the upper portion thereof free which locates the work and aligns the axes of the work and said support and means to rotate the work for any adjusted position thereof.

CARL G. FLYGARE.
WALLACE H. WOOD.